United States Patent Office 3,443,438
Patented May 13, 1969

3,443,438
FLUID INDICATING APPARATUS
Robert Edgar Martin, Meads 19 Elles Ave., Merrow, near Guildford, Surrey, England, Edmond Francis Hasler, 75 Oakhill Road, Ashstead, Surrey, England, and James Nigel Prewett, 17 Elles Ave., Merrow, near Guildford, Surrey, England
Filed Feb. 10, 1967, Ser. No. 615,221
Int. Cl. G01f 23/26
U.S. Cl. 73—304                        13 Claims

ABSTRACT OF THE DISCLOSURE

In fluid level indicating apparatus having sensors at a number of different levels, failure indicating means are provided which operate an alarm or the like if an indication is obtained of a denser fluid above the level of a less dense fluid, e.g., if water is sensed above steam in a boiler.

---

This invention relates to fluid level indicating apparatus, and in particular to failure detecting apparatus for such indicating apparatus.

According to one aspect of this invention there is provided for indicating apparatus for indicating which of two fluids is present at a number of different levels in a container, failure detecting apparatus comprising connecting means responsive to the indication by the indicating apparatus of the presence or absence of the heavier fluid at each level and arranged to complete a circuit when the indicating apparatus indicates the presence of the heavier fluid at one level and its absence at a level below that one level, and failure indicating means connected for energisation through the completed circuit. The presence of the heavier fluid at one level and its absence at a level below that one level is not what would be expected. Either a disturbance in the container or a failure of the indicating apparatus has occurred and should be investigated, and to this end a circuit is completed through which failure indicating means is energised.

According to another aspect of this invention there is provided for indicating apparatus for indicating which of two fluids is present at a number of different levels in a container, failure detecting apparatus comprising first and second two-state devices for each of the different levels, operating means for each of the levels for placing the first and second two state devices in a first or second state corresponding respectively to the presence or absence of the heavier fluid at that level and connecting means for each level completing the circuit between the first two state device of that level when in the first state and the second two state device of the level immediately below when in the second state and failure indicating apparatus connected for energisation through any such completed circuits. Normally the indicating apparatus will indicate the heavier fluid to be present at all the levels below a certain level and to be absent from all the levels above this level. The two-state devices of all the lower set of levels will be held in the first state, and those of the upper set in the second state. The connecting means will not complete a circuit between a first device in the first state and the second device of the level immediately below in the second state since there will be no such combination. If a component should fail so that heavier fluid is indicated at levels above levels occupied by the other fluid there will be an ambiguous indication of the interface between the two fluids. At the regions where the heavier fluid is indicated above the other, the first device of the level immediately above the interface will be in its first state and the second device of the level on the lower side of the interface will be in its second state, so that the connecting means completes a circuit through the two devices and the failure indicating apparatus is energised through the completed circuit.

The term fluid in this specification includes gases, vapours, liquids and like substances such as solids in granular form.

In one embodiment the first and second two-state devices comprise contacts of an electromagnetic relay operable by the operating means.

Means may be provided for simulating the presence and/or absence of the heavier fluid at all levels.

The operating means of all the levels may be provided with alternative power sources. In one arrangement there are two power sources for all the operating means, the operating means of consecutive levels being connected to alternate power sources. This type of arrangement of the grouping of channels into two or more sets is hereinafter referred to as "interleaved."

The invention includes within its scope fluid level indicating apparatus for indicating which of two fluids is present at a number of different levels in a container comprising failure detecting apparatus as described above. There may be a plurality of sets of fluid level indicating apparatus, connected respectively to interleaved set of levels in the container. In the event of failure of one or more sets, the remaining sets can still indicate the fluid level.

An example of the invention will now be described with reference to the drawings accompanying the Provisional Specification in which.

Figure 1:
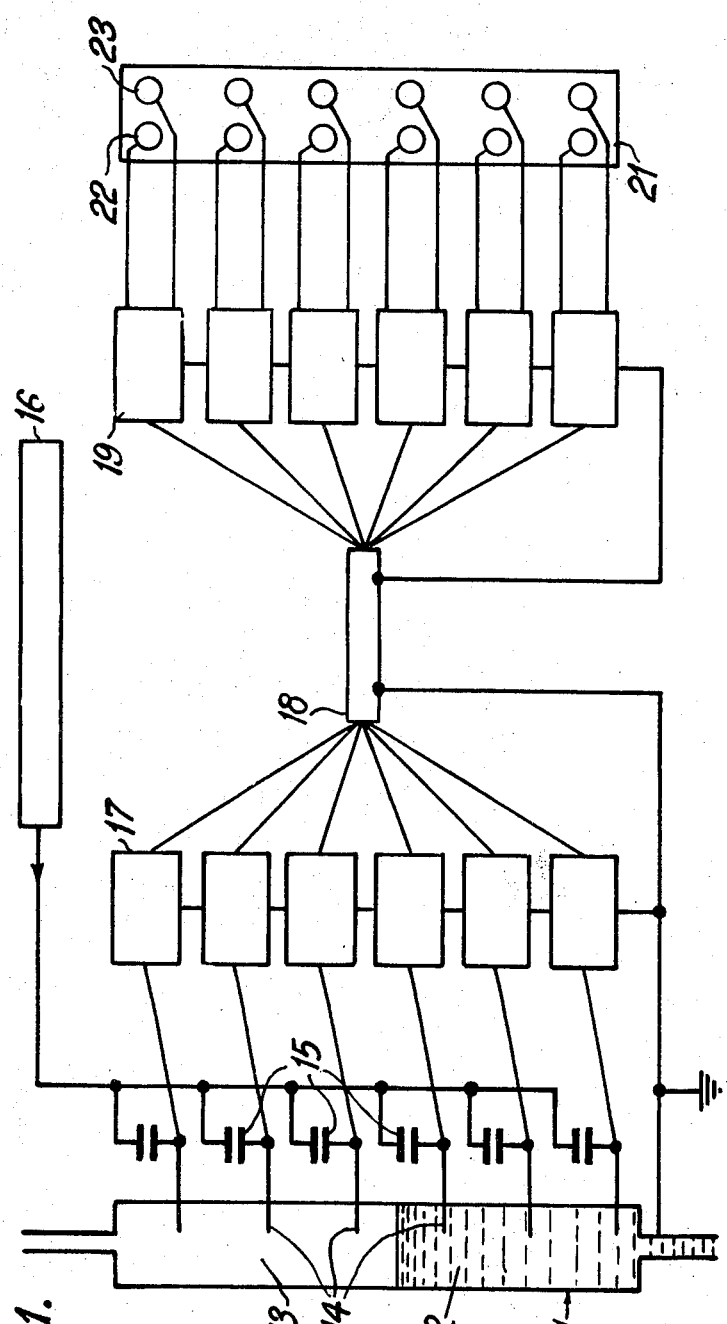
FIGURE 1 is a diagram of a fluid level indicating apparatus.

A vessel 11 contains water in its lower portion 12 and steam in its upper portion 13. A number of probes 14 are mounted at different levels in the side of the vessel 11 and are insulated therefrom. The probes 14 are connected through capacitors 15 to a common waveform generator 16. Each probe 14 is connected to a detector which is connected through a core of a multicore cable 18 to a relay unit 19 operated by the output of the detector. A display 21 has a red lamp and a green lamp 23 for each probe, and either the red or the green lamp is illuminated according to the state of the relay 19.

Figure 2:
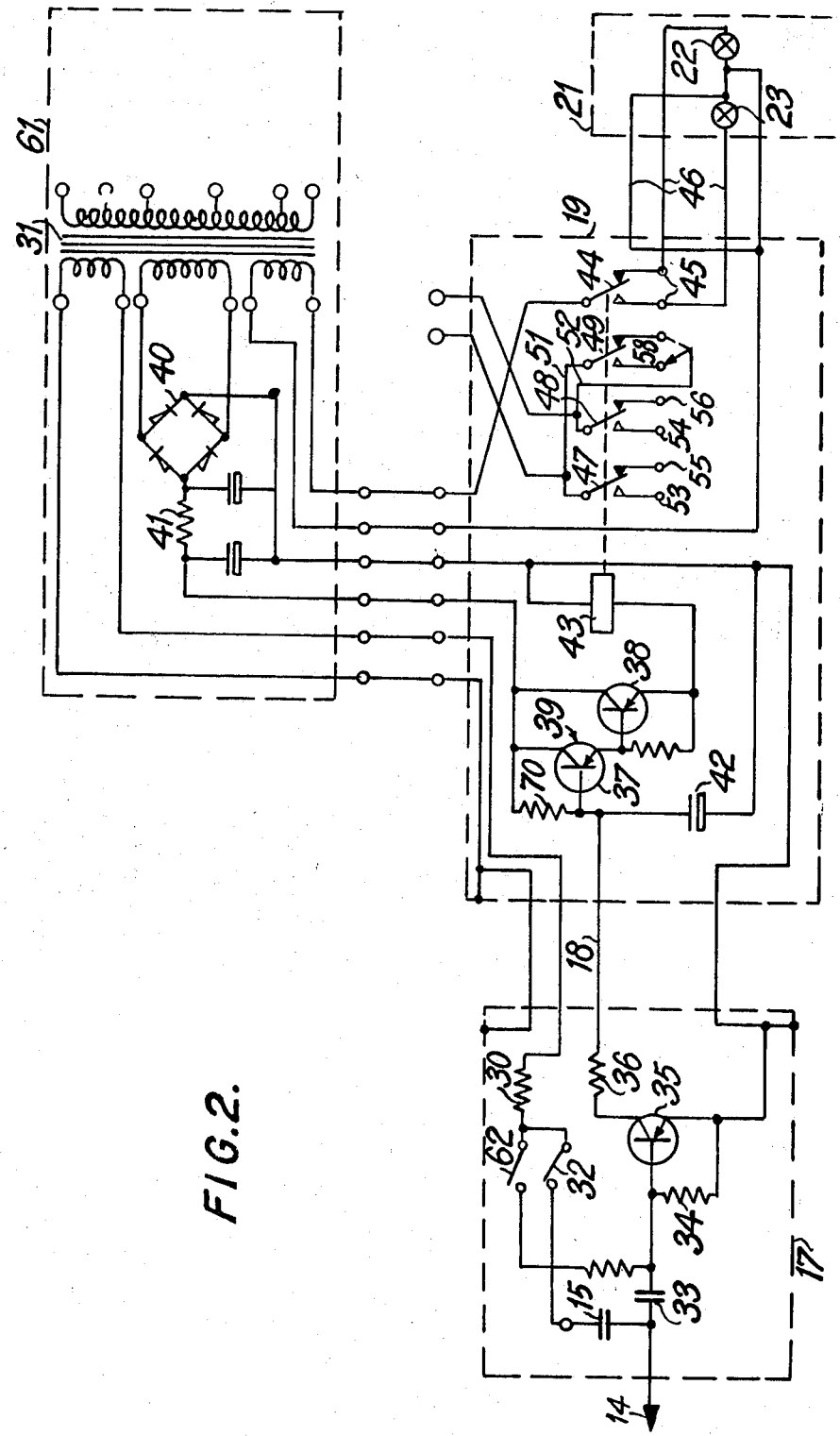
FIGURE 2 is a circuit diagram of components of the apparatus of FIGURE 1.

Referring to FIGURE 2 an input signal at mains frequency is supplied from the input transformer 31 through a high impedance 30 and a test switch 32 (to be hereinafter described) and the capacitor 15 to a central electrode of the probe 14. The central electrode is of nickel iron alloy encircled by a ceramic insulator of 99.5% sintered alumina. The insulator is held in a stainless steel body screwed through the side of the vessel. The vessel is of mild steel and is electrically connected to earth. The material of the central electrode and the body is chosen so that its coefficient of thermal expansion matched that of the ceramic over a wide temperature range.

The signal between the electrode of the probe and the vessel is connected across a potential divider comprising a capacitor 33 in series with a resistor 34. The probe 14 is thus isolated from the remainder of the circuit for direct currents by the capacitors 33, 15, so that no polarization or consequent corrosion may occur. The signal across the resistor 34 is connected to the base of a detector transistor 35. The collector of the detector 35 is connected through a resistor 36, and a core of the multi-core cable 18 both to the base of a transistor 37, and through a resistor 70 to a power supply line. The transistor 37 and a second transistor 38 form a two-stage emitter follower 39. The power for the emitter follower is obtained from the input transformer 31 through a full-wave rectifying bridge 40 and a CR network 41 which provides a smoothed full-wave rectified signal. A capacitor 42 is connected across the input of the emitter follower 39 and the coil of a relay 43 is connected across the output. The multicore cable 18 enables the emitter follower to be remote from the probe 14.

The relay moves a contact 44 between two terminals 45 connected respectively to the red and green lamps 22, 23. When the lamps are remote from the relay unit, the connections are through further multicore cables 46. Power for the lamps is supplied from the input transformer 31. The relay moves three other contacts 47, 48, 49 to be hereinafter described.

The input transformer 31, the bridge 40 and the CR network 41 form a power supply unit 61 which may supply the power to the probe relay and lamps of every level.

When the probe 14 is immersed in the water, the water provides a low impedance path (of the order of 1 to 10 kilohms) for the signal from the capacitor 15 to the vessel 11 and substantially no signal is applied to the base of transistor 35 through capacitor 33. Transistor 35 is arranged to be cut off in these circumstances, and its collector remains at a high potential.

When the probe 14 is not immersed in the water the signal from capacitor 15 has only a high impedance path (greater than 100 kilohms) to the vessel and a large signal is applied to the base of the detector 35. During negative half cycles of this signal the transistor 35 conducts heavily, reducing the potential of its collector and discharging capacitor 42.

The emitter follower 39 acts as a power amplifier. When the probe 14 is immersed, the high potential on the collector of transistor 35 causes the emitter follower to energise the coil of relay 43 in its output circuit. When the probe 14 is not immersed transistor 35 conducts periodically and reduces the potential on its collector so that the relay 43 is not energised.

The red lamp 22 is illuminated when the relay is deenergised indicating the presence of steam. When the relay 43 is energised the contact 44 is moved to the other terminal 45 and the green lamp 23 is illuminated instead of the red lamp 22.

As indicated in FIGURE 1, the display is formed by the red and green lamps from the different levels arranged in two columns. In normal operation the lower lamps will be green, showing the presence of water at the corresponding levels, and the upper lamps will be red. The water level will be between the levels corresponding to the lowest red and highest green lamp.

The test switch 32 may be opened to remove the signal from the input transformer 31 to the probe 14. This removal simulates the presence of water at the probe and the green lamp 23 should be illuminated when the test switch 32 is opened whether the probe is immersed or not.

A second test switch 62 may be closed to apply the signal from the input transformer 31 to the base of transistor 35. In this case the signal is applied to the transistor 35 independently of the immersion of the probe and simulates the presence of steam at the probe 14. When the second test switch 62 is closed the red lamp 22 should be illuminated whether the probe is immersed or not.

If a fault should occur so that a green lamp (indicating water) is illuminated above a red lamp (showing steam) there will be two water levels indicated, and the display will be ambiguous. The system is arranged to sound an alarm should such a fault occur.

Figure 3:
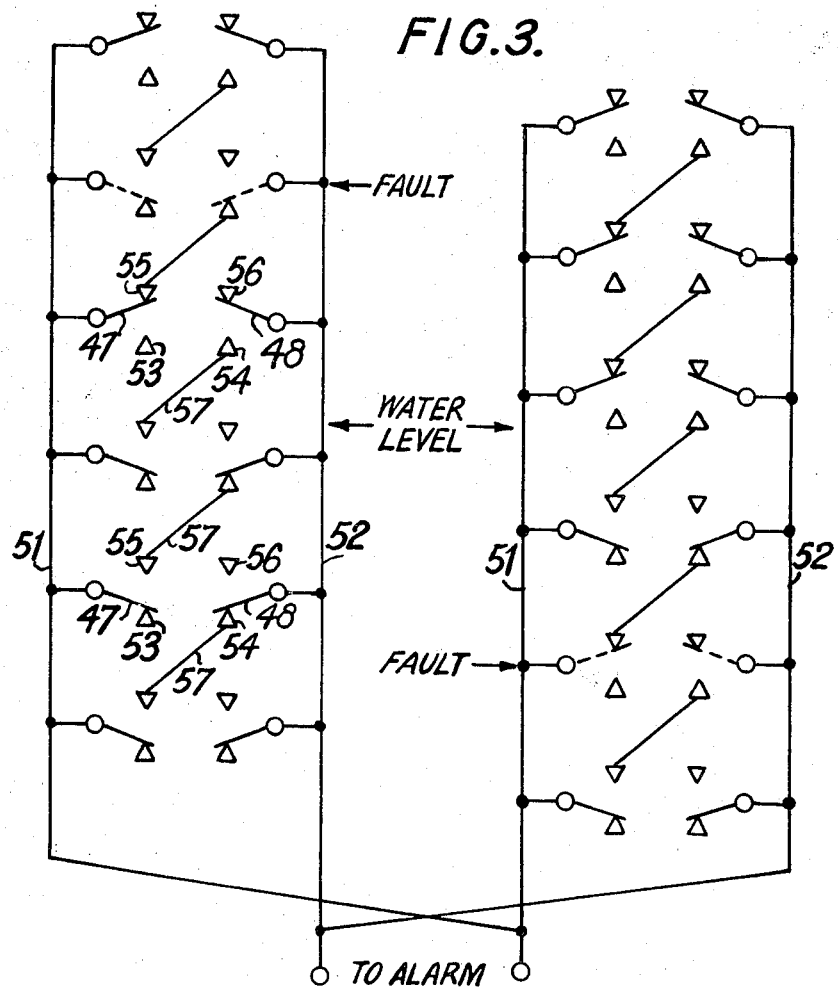
FIGURE 3 is a circuit diagram of components of failure detecting apparatus for the apparatus of FIGURE 1, and a second similar apparatus.

The contacts 47, 48 and their terminals 53 to 56 from each of the six levels of the apparatus of FIGURE 1 are connected into the circuit on the left hand side of FIGURE 3.

The contacts 47 of every level are connected to a common line 51 and the contacts 48 of every level are connected to a second common line 52. An alarm and its power supply are connected to lines 51 and 52 so that when the circuit between the lines 51 and 52 is completed, the alarm is sounded.

When the relay 43 is energised and the green lamp 23 is illuminated, the contacts 47, 48 are arranged to contact their respective lower terminals 53, 54 (as seen in FIGURE 3). When the relay is de-energised and the red lamp 22 is energised, the contacts 47, 48 are arranged to contact their respective upper terminals 55, 56. The lower terminal 54 of each contact 48 is connected to the upper terminal 55 of the contact 47 of the level immediately below by cross-connections 57.

When a fault occurs so that the relay 43 of one level is energised to indicate water and the relay 43 of the level immediately below is deenergised to indicate steam, a cross connection 57 completes the circuit from ilne 51 to line 52 through the appropriate contacts 47, 48 and terminals 54, 55, and the alarm is sounded.

The right hand side of FIGURE 3 shows a circuit similar to that on the left hand side. The right hand side circuit is connected to a second set of probes as shown in FIGURE 1, but arranged at levels alternating with those of the first set. The contacts 47, 48 are shown in FIGURE 3 in positions corresponding to the levels of the corresponding probes 14, those of the right hand side being in positions alternating with those on the left hand side.

The lamps 22, 23 of the two sets of apparatus are arranged in single red and green columns at positions corresponding to the levels of the probes operating the lamps.

Figure 4:
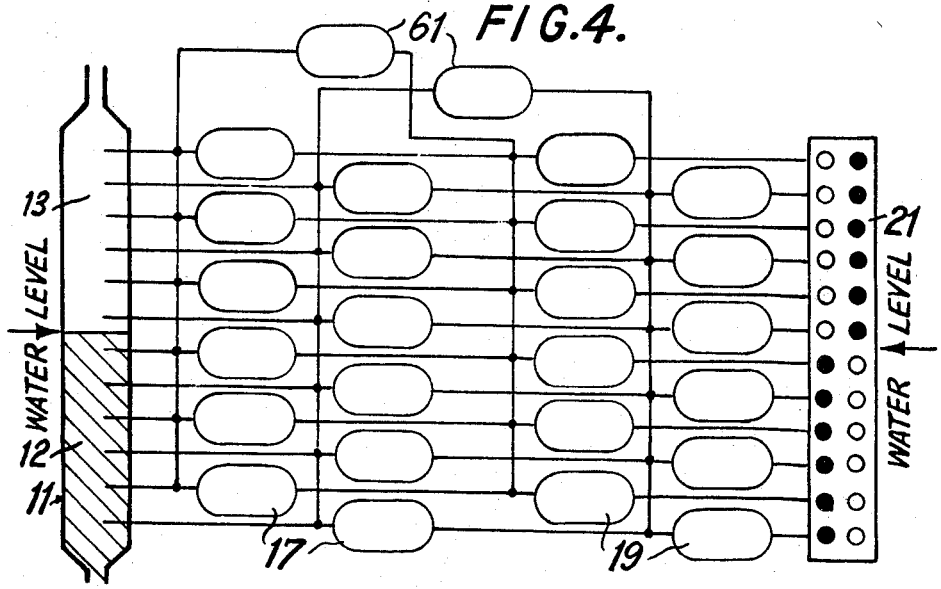
FIGURE 4 is a block diagram of components of two sets of the apparatus of FIGURE 1.

The sets of probes and their associated detectors and relay units are supplied by separate power units 61 as shown in FIGURE 4.

FIGURE 3 indicates the positons of contacts 47, 48 when the water level is between the third and fourth probes of both sets. The second relay of the first set has jammed in the water indicating position, so that the display indicates water at the second level above steam at the third level. A connection between the first lines 51, 52 is made through contact 47 and terminal 55 of the third level, cross-connection 57 and terminal 54 and contact 48 of the faulty relay at the second level. The alarm is energised through the connected lines 51, 52.

A second fault is shown in FIGURE 3, the fifth relay of the second set having stuck in the steam indicating position, so that the display indicates steam at the fifth level below water at the fourth. A connection is now made across the second lines 51, 52.

Should a fault occur in one set of apparatus, its power supplies may be disconnected and its lines 51, 52 disconnected from the alarm system, in case any relay contacts are jammed in the energised position and the level will now be indicated, to a lower degree of accuracy, by the other set.

The contacts 49 are used to operate an alarm when the vessel 11 becomes sufficiently full or empty of water. For example the alarm may be operated when any of the top three levels indicates water and when any of the lower three levels indicates steam. Separate high low level alarms may be used, and each alarm may be graduated to operate with increasing intensity as the vessel becomes increasingly full or empty. In FIGURE 2, the contact 49 is connected to line 51 and one of its terminals 58 is connected to line 52. The choice of the one terminal 58 depends on whether a high or low level alarm is required at that level. When no such alarm is required neither terminal 58 is connected to line 52.

Other faults may occur in the apparatus. For example, the power supply to the input transformer 31 may fail so that all the relays 43 are deenergised and all the lamps 22, 23 are extinguished. Provided the alarm is on a separate power supply a low level alarm will be sounded as all the relays will be deenergised simulating the presence of steam at all levels.

The chance of total power supply failure is lessened by the use of a separate power supply 61 to each set of apparatus. This arrangement ensures that substantially the whole range of levels within the vessel is covered by each power supply as when one power supply fails alternate levels are still energised. The water level within the vessel is still indicated although to a lower degree of accuracy as the distance between energised probes is doubled.

When only the signal supply to the probe 14 fails, the probe 14 will appear to be immersed as it is supplying no signal to transistor 35. If the supply to all the probes 14 fails the probes will simulate water at al levels and the high level alarm will be sounded. The second test switch 62 will be ineffective, as closing it will not apply a signal to the transistor base 35.

When only the smoothed supply to the emitter follower 39 fails the relay 43 will be deenergized and the presence of steam will be simulated. Removal of the probe signal supply by opening test switch 32 will have no effect.

Failure of one or both of the lamps associated with a level will not give a false indication. If the water level should be adjacent that level the level will be indicated with a lower degree of accuracy, but will not be shown incorrectly. Lamp failure is obvious and is not arranged to operate an alarm. The red and green lamps can be tested by operating test switches 62 and 32 respectively.

If the water level occurs at the level whose associated relay has stuck in the wrong position, the water level will be indicated one probe-separation above or below its true level and the alarm will not be sounded until the water level moves sufficiently for the faulty relay to indicate water over steam.

The red and green lamps 22, 23 may be mounted behind a translucent panel which appears the colour of the lamp illuminated behind it. Any convenient number of sets of lamps may be used to provide displays in different places. The multicore cables 18, 46 enable the emitter follower 39 to be remote from the vessel 11, which may be hot and the lamps 22, 23 to be in any convenient location.

An analogue indication of the depth of water may be obtained by summing the currents taken by all the green lamps, or of the height of steam by summing the red lamp currents.

As an alternative or in addition to the operation of the alarm, automatic control of the fluid level in the vessel may be initiated through contacts 49.

Additional reliability may be obtained by substituting two lamps in parallel for each lamp described above. This has particular application when the lamps are mounted behind a translucent screen so that the outlines of the lamps are diffused.

The electromagnetic relays may be replaced by solid state devices, such as transistors, silicon controlled rectifiers, tunnel diodes, thin film or solid integrated logic circuits, single or multiple aperture ferrite devices, saturable reactors, transductors, and any circuitry accessories such devices may require.

The design of the probe described above may be varied. For example a combination of titanium and either alumina or zirconia ceramic and a brazed construction has been found to have advantages for higher temperatures and pressures. Nevertheless, many other designs of probe could be used dependent on their ability to provide and maintain the required mechanical and electrical characteristics in the presence of the chemical, thermal and pressure environments concerned.

The mode in which the impedance at the probe 14 is varied by the change in fluid can be different from that described above. For example, the movement of fluid may be used to change the capacitance of the probe, or the inductance of a probe in the form of a coil supplied with a signal frequency. This last mode is useful in measuring levels of liquids containing iron dust, or for liquid oxygen or liquid metals. The circuit of FIGURE 2 can similarly be varied, for example by replacing the potential divider 33 and 34 by an all capacitor network.

We claim:

1. Fluid level indicating apparatus, comprising indicating apparatus for indicating which of two fluids is present at a number of different levels in a container; connecting means which is responsive to the indication by the indicating apparatus of either the presence or absence of heavier fluid at each level and which is arranged to complete a circuit when the indicating apparatus indicates the presence of heavier fluid at one level and its absence at a level below that one level, and failure indicating means which is connected for energisation through the completed circuit.

2. Fluid level indicating apparatus comprising apparatus for indicating which of two fluids is present at a number of different levels in a container, first and second two-state devices for each of the different levels, operating means for each of the levels for placing the first and second two-state devices in a first or second state corresponding respectively to the presence or absence of a heavier fluid at that level and connecting means for each level completing a circuit between the first two-state device of that level when in the first state and the second two-state device of the level immediately below that level when in the second state and failure indicating apparatus connected for energisation through any such completed circuits.

3. Apparatus as claimed in claim 2 wherein the two-state devices each comprises an electromagnetic relay operable by the operating means.

4. Apparatus as claimed in claim 2 wherein testing means are provided for simulating the presence and/or absence of the heavier fluid at all levels.

5. Apparatus as claimed in claim 2 wherein there are provided two alternative power sources and wherein operating means of consecutive levels are connected for energisation by alternate power sources.

6. A fluid level detection system comprising a plurality of sets of fluid level indicating apparatus as claimed in claim 1, the sets being connected respectively to interleaved sets of levels in the container.

7. Liquid level indicating apparatus for indicating the level of a liquid in a container comprising a plurality of sensors at different levels, which sensors are arranged to give an electrical output indicating the presence or absence of liquid at the level of the sensor, a series of two-state indicators, one for each level, circuit means for controlling said two state indicators each from its associated sensor to indicate the presence or absence of liquid, failure indicating means and a logic circuit for controlling said failure indicating means in accordance with the outputs of said sensors, which logic circuit operates the failure indicating means if the sensors indicate the presence of a liquid at one level and its absence at a level below said one level.

8. Liquid level indicating apparatus as claimed in claim 7 wherein said two-state indicators each comprise a pair of differently colored lamps.

9. Liquid level indicating apparatus as claimed in claim 7 wherein each sensor comprises an electrode in said container and means responsive to the impedance of an electrical circuit through contents of the container to said electrode.

10. Liquid level indicating apparatus as claimed in claim 7 wherein each sensor is arranged to operate a relay which controls the associated two-state indicator.

11. Liquid level indicating apparatus as claimed in claim 10 wherein each relay has, as part of said logic circuit, first and second change-over contacts, the first change-over contact at each level being arranged when liquid is detected to complete a circuit to the second contact of the relay of the next lower level so as to complete a circuit for said failure indicating means only if the relay at said next lower level is in the state corresponding to an absence of liquid.

12. Liquid level indicating apparatus as claimed in claim 11 wherein testing means are provided for selectively operating said two-state indicators to simulate the presence of liquid at each of the different levels.

13. Liquid level indicating apparatus as claimed in claim 12 wherein testing means are provided for selectively operating said two-state indicators to simulate the absence of liquid at each of the different levels.

References Cited

UNITED STATES PATENTS

| | | | |
|---|---|---|---|
| 2,261,495 | 11/1941 | Ewertz | 340—244 |
| 3,257,643 | 6/1966 | Jensen | 340—244 |

FOREIGN PATENTS 804,855  11/1958  Great Britain.

LOUIS R. PRINCE, *Primary Examiner.*

D. O. WOODIEL, *Assistant Examiner.*

U.S. Cl. X.R.

340—188, 409